United States Patent [19]

Bory

[11] Patent Number: 4,576,663

[45] Date of Patent: Mar. 18, 1986

[54] ORDER CHANGE METHOD AND APPARATUS FOR CORRUGATOR MACHINE

[75] Inventor: William H. Bory, Baltimore, Md.

[73] Assignee: Chesapeake Corporation, West Point, Va.

[21] Appl. No.: 646,247

[22] Filed: Aug. 31, 1984

[51] Int. Cl.[4] .............................................. B32B 31/00

[52] U.S. Cl. ...................................... 156/64; 156/361; 364/471

[58] Field of Search ................. 156/350, 353, 361, 64, 156/470; 364/471

[56] References Cited

U.S. PATENT DOCUMENTS 4,268,341 5/1981 Huhne ............................. 156/361 X 4,284,445 8/1981 Shimizu ........................... 156/361 X 4,288,273 9/1981 Butler et al. ......................... 156/361

*Primary Examiner*—David Simmons

*Attorney, Agent, or Firm*—Finnegan, Henderson, Farabow, Garrett & Dunner

[57] ABSTRACT

A method and apparatus for producing an order change in a corrugator machine. A pulse generator is provided on the medium splicer of each single facer in a corrugator machine and on the splicer of a double backer to produce feedlength signals proportional to web material supplied by each splicer. A computer calculates position values which are functions of the relative physical locations of the corrugator machine components, and inventory values which are functions of the relative physical locations and of differences in the feedlength values. The computer then compares feedlength signals and inventory values and as a result of these comparisons, generates sequential control signals to corrugator machine components to produce an order change including a synchronous splice of all web components with a minimum of waste and production downtime.

23 Claims, 3 Drawing Figures

ORDER CHANGE METHOD AND APPARATUS FOR CORRUGATOR MACHINE

BACKGROUND

The invention relates generally to multiple-layer web processing and, more particularly, to a method and apparatus for changing the type of corrugated paper product web produced by a corrugator machine.

It is well-known to produce various types of corrugated paper products from a single corrugator machine. Such a machine can include one or more component machines, known as single facers, which form single ply webs such as kraft paper into a fluted medium, or spacer, and fuse the medium to a second single ply web known as a liner. The laminated liner-medium may be joined to another liner, or to a liner-medium composite, in a machine known as a double backer. The double backer can thus produce single or double-ply corrugated fiberboard in a continuous composite web.

The output of the double-backer can be supplied to various types of processing machines such as rotary shears, slitter/scorers, and material handling equipment, collectively known as the "dry end" of the corrugator machine. The dry end also generally includes one or more knives for cutting the continuous composite web into individual boards or blanks. The individual component machines of the corrugator can be controlled as a unit as is well-known in the art.

Such corrugator machines can produce a wide variety of composite web material by providing various gauges and widths of individual web material to the single facers, and adjusting the dry end of the machine to produce various widths, lengths and configurations of individual fiberboard blanks. However, when the processing for one order of blanks of a given configuration has been completed, a significant amount of time is required using prior art practices to alter the adjustable configuration of the corrugator machine and produce blanks for a second order having a different set of specifications. The steps involved in such an order change may include replacing the supplies of individual web material feeding the single facers and double backer, adjusting the web guides throughout the machine to accommodate a different size of raw material, and changing the operating program of the dry end of the corrugator to slit the continuous web into different widths or cut it into different length blanks.

A corrugator machine is an expensive, fast, high-output machine. Thus, it is desirable not only to minimize the production downtime during an order change, but also to eliminate waste material to the greatest extent possible. It is therefore an objective of the present invention to operate the various components of the corrugator machine so that material for a new order is fed in proper sequence to produce a composite web which changes from the composition of the old order to the composition of the new order with a minimum of waste and lost production time.

A specific problem in achieving an order change in a corrugator machine which provides a multiple-ply output web material is to synchronize the splices of the various web components so that these splices are coincident when the individual web components are formed together into the composite web output. One method of achieving synchronous splices is to slow down the corrugator machine and activate a single splicer for an individual web component. The operator visually tracks the splice and activates the second splicer at what is estimated to be the proper time to achieve coincidence of the two splices. In a similar manner, the remaining splices are produced by the operator running from one splicer to the next, and actuating each one in sequence. In this manner, splices are provided in each of the individual components which may be reasonably coincident at the output of a double backer. However, trial and error methods associated with such an approach are time consuming and often inaccurate, resulting in individual web component splices which could be separated by as much as 100 feet from other component splices. Accordingly, a significant amount of waste material is produced.

Attempts have been made to provide synchronous splicing with reduced down time and increased accuracy by sensing either indicia preprinted onto the individual web component material or magnetic indicators such as tape applied to the individual web component material. Although some success was achieved by these methods in the prior art, printed indicia required special processing of the input web component materials during manufacture, and magnetic sensing methods required an operator to physically place the magnetic tape indicators at the proper position. This task complicated the duties of the operator of the corrugator machine and, in any case, resulted in only a limited improvement in the amount of down time required during an order change.

It is therefore an additional objective of the present invention to provide an apparatus and method for an order change in a corrugator machine which will require neither specially processed input materials nor an excessive amount of operator intervention.

SUMMARY OF THE INVENTION

The present invention provides a method and apparatus for producing an order change in a corrugator machine with a minimum of material waste, production down time, and operator intervention. Furthermore, no special processing of input materials to the corrugator machine is required.

These advantages are provided by apparatus for a corrugator machine having a plurality of single facers each having a pair of splicers supplying a single layer web, a double backer having a splicer supplying a single layer web, and a shear for processing the output material of the double backer. Signal generators for producing feedlength signals proportional to the length of single ply web material are supplied for a first splicer of each single facer and for the splicer of the double backer. A memory device is also provided for storing a plurality of position values which are functions of the relative locations of the first and second splicers of the single facers, the double backer, and the shear. The memory device also stores inventory values which are also functions of relative machine locations and of the differences between the feedlength signals.

A control computer is provided for comparing feedlength signals, position values, and inventory values, and for generating control signals to sequentially operate the splicers and the shear when the differences between the signals and stored values reach predetermined values. Thus, the splices in individual single ply web materials of the composite web material output of the double backer and the severance in the composite material separating the first and second orders are in substantial coincidence.

In operation, a first splicer of the single facer located farthest upstream from the double backer is activated. An upstream feedlength value proportional to the amount of web supplied by the activated splicer is produced by one of the signal generators. This upstream feedlength value is continuously compared to an upstream position value which is a function of the relative locations of the two splicers of the upstream single facer. The second splicer of the upstream single facer is then activated when the difference between the feedlength value and the upstream position value reaches a predetermined value.

The computer then continuously monitors an intermediate feedlength value proportional to the amount of web material supplied by a first splicer of the next downstream single facer. This intermediate feedlength value is supplied by another of the signal generators and is compared to a first intermediate inventory value which is a function of the relative location of the next downstream single facer and the upstream single facer. The first intermediate inventory value is also a function of the difference between the feedlength value proportional to the amount of webs supplied by the upstream single facer and the intermediate backer feedlength value. A first splicer of the next downstream single facer is then activated when the difference between the intermediate feedlength value and the first intermediate inventory value reaches a predetermined value.

Next, the intermediate feedlength value is continuously compared to a second intermediate inventory value which is a function of the relative locations of the first and second splicers of the next downstream single facer. When the difference between the intermediate feedlength value and the second intermediate inventory value reaches a predetermined value, the second splicer of the next downstream single facer is then activated. The preceding steps involving intermediate feedlength and inventory values are repeated for each downstream single facer.

Finally, the computer continuously compares the double backer feedlength value to a bridge inventory value which is a function of the relative physical locations of the upstream single facer and the double backer and is also a function of the difference between the upstream feedlength value and a double backer feedlength value proportional to the amount of material output from the double backer. The computer then activates the double backer splicer when the difference between the upstream feedlength value and the bridge inventory value reaches a predetermined value.

In this manner, all splices of the individual web components are substantially coincident when the individual components are provided as a composite web output by the double backer.

DESCRIPTION OF THE PREFERRED EMBODIMENT

Figure 1:
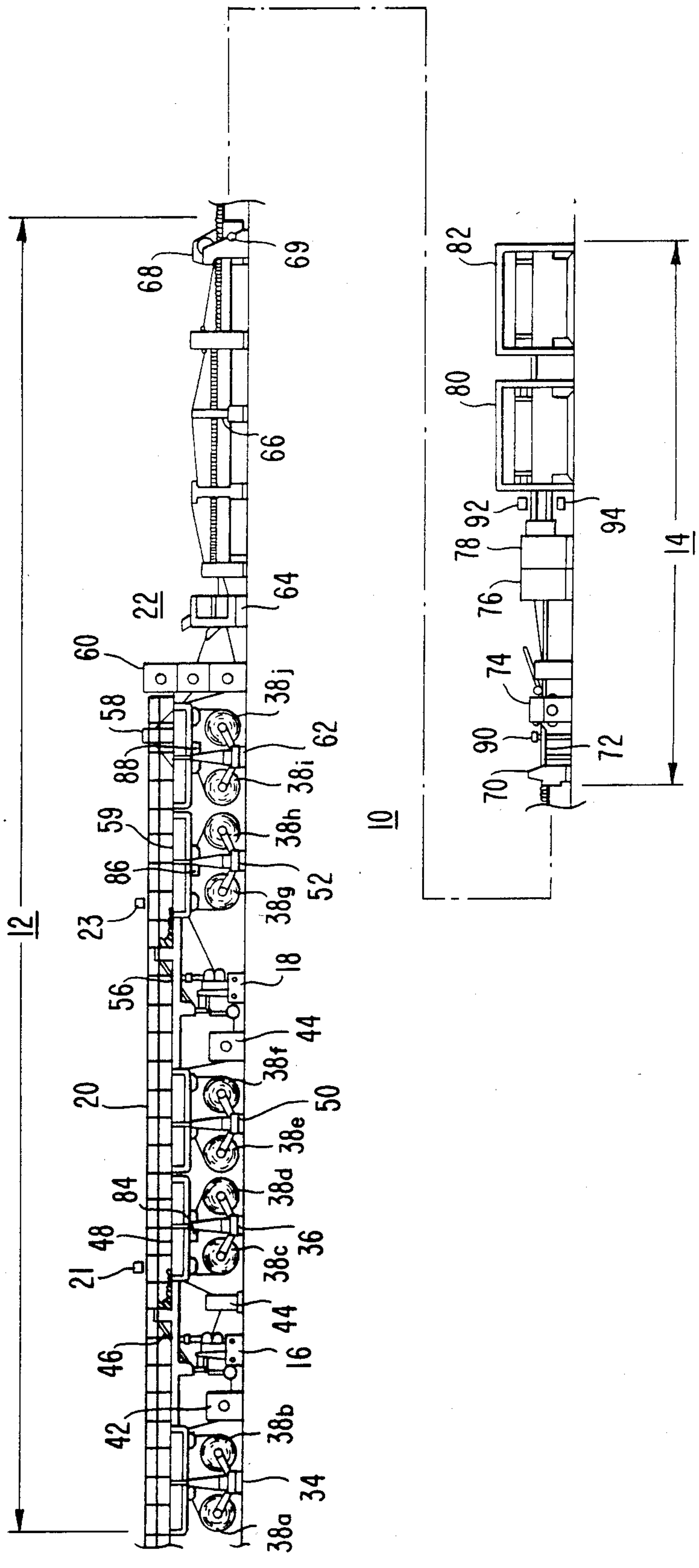
FIG. 1 is a schematic view of a corrugator machine incorporating a preferred embodiment of the present invention.

Reference will now be made in detail to the presently preferred embodiment of the invention, an example of which is illustrated in the accompanying drawings. Throughout the drawings, like reference characters are used to refer to corresponding elements.

FIG. 1 shows a corrugator machine which incorporates the principles of the present invention. The corrugator machine 10 continuously produces material, known as corrugator fiberboard, which is commonly formed into boxes for packing containers and the like. The corrugator machine 10 includes a so-called "wet end" 12 and a "dry end" 14. The wet end 12 includes component machines which form a plurality of individual single layer paper webs into a multi-ply composite web. The dry end 14 processes the continuous composite web output of the wet end into composite fiberboard blanks of predetermined sizes by various cutting, slitting and scoring operations.

In accordance with the invention, means are provided for producing a plurality of webs at respective rates of output. As embodied herein, these means include a pair of single facer machines 16 and 18 which are part of the wet end 12. The single facers 16 and 18 are well-known in the art and may be the type C and B single facers, respectively, obtainable commercially from the Langston Corporation. As shown in detail in FIG. 2, each single facer produces a two-ply web 24 consisting of a liner 26 and a fluted corrugated medium layer 28. Each of the two-ply webs 24 are combined with a double backer liner 30 to form a double-ply composite web 32.

The single facers 16 and 18 will be referred to hereinafter as the C-flute single facer and B-flute single facer, respectively. Although in the preferred embodiment the corrugator machine 10 includes two single facers, it is to be understood that in other embodiments of the invention, either more or fewer single facers could be provided according to the type of composite output product that is desired.

The individual two-ply laminated web outputs 24 from the C-flute single facer 16 and B-flute single facer 18 are transported over a bridge 20 to the double backer machine 22, which serves to laminate the pair of two-ply webs 24 produced by respective single facers 16 and 18 to the double backer liner 30 to produce the double-ply composite corrugated web 32.

Referring once again to FIG. 1, it can be seen that the C-flute single facer 16 is the single facer which is located at the greatest distance upstream from the double backer 22 and is thus alternatively referred to as the upstream single facer. Associated with the single facer 16 is a pair of splicers 34 and 36. The splicers 34 and 36 each include a respective pair of roll stands **38*a*,38*b* and 38*c*,38*d*, each of which supports a roll of single layer web material such as kraft paper. The splicers 34 and 36** are of well-known construction and may be the Model M and MS splicers, respectively, obtainable commercially from the Marquipt Corporation.

Only one of the roll stands of each splicer supplies paper to the corrugator machine 10 when operating. The other roll stand of the splicer contains material which will be spliced onto the material from the first roll stand when either the first roll of material is exhausted, or when it is desired to change the output material of the corrugator machine 10 from a composite web material specified by a first order to a different composite web material specified by a second order.

The material not currently being supplied to the single facer is threaded into the splicers 34 or 36 such that when the splicer is activated, the material from the roll currently supplying the associated single facer is severed and the material from the replacement roll is automatically butt spliced onto the trailing edge of the severed web. The splicing process can thus occur "on the fly" without slowing down the operation of the corrugator machine 10.

The material from the splicers 34 and 36 may pass through material preparation machines, such as a preheater 42 or a preconditioner 44, which serve to prepare the material for proper operation of the associated single facer. The necessity for and operation of the preheater 42 and preconditioner 44 are wellknown in the art and constitute no portion of the present invention. Accordingly, they will not be further described.

Figure 2:
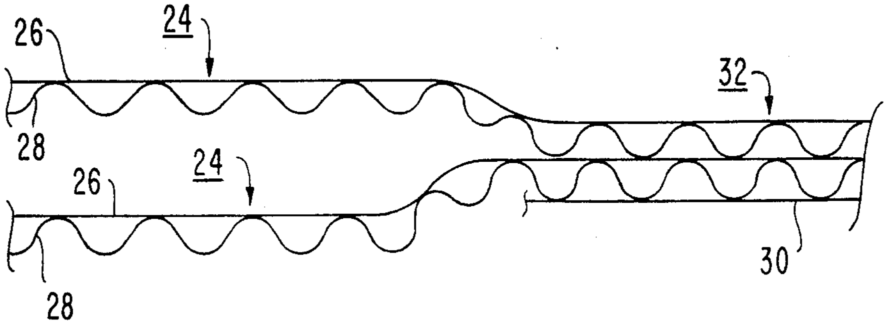
FIG. 2 is a schematic view of the output web materials produced by various components of the corrugator machine of FIG. 1.

Material from the splicers 34 and 36 enters the C-flute single facer 16 where it is manipulated and glued to form two-ply web material 24, as shown in FIG. 2. It can be appreciated that the length of material output from the single facer 16 is equal to the length of material supplied by the C-flute liner splicer 34. However, due to the corrugation of the medium in the two-ply web 24, a greater linear footage of material will be supplied by the C-flute medium splicer 36 than the linear footage of the output of the C-flute single facer 16. The ratio between output material of the medium splicer 36 and output material of the single facer 16 is fixed by the physical configuration of the single facer 16 and may be, for example, 1.47 feet of medium material from splicer 36 for each foot of the two-ply web material supplied by the single facer 16.

The liner and medium material 26 and 28 from the splicers 34 and 36, respectively, are drawn therefrom by drive rolls in the single facer 16, and supplied to an input port on the bridge 20. The two-ply web material 24 output from the single facer 16 is received by a pair of sandwich belts 46 which operate at a slightly faster rate than the output of the single facer 16 and serve to draw the output material of the single facer up onto the bridge 20. An additional belt 48 is driven at a rate which is a percentage of the operating speed of the single facer 16, such as 10%, and serves to pull the output material 24 off of the bridge 20 and into the double backer 22. The relative operating speed of the double backer 22 and the single facer 16 are determined in a well-known manner so as to cause an inventory amount of the material 24 to accumulate on the bridge 20. The amount of material so accumulated is determined by operating characteristics of the corrugator machine when producing various types of material, in a manner which is also well-known.

The B-flute single facer 18 operates in a manner similar to the C-flute single facer 16. A liner splicer 50 and medium splicer 52 are provided, each having a pair of roll stands 38*e*,38*f* and 38*g*,38*h*. The single ply material supplied by the splicer 50 may pass through a preheater 44 in the manner described previously with regard to the C-flute single facer 16. Two-ply web material 24 produced by the single facer 18 is provided to an input port of the bridge 20 and is drawn up onto the bridge 20 by sandwich belts 56 to provide an inventory of B-flute single facer output material on the bridge 20. The web material 24 from the single facers 16 and 18 passes through adjustable bridge web guides 58 which position the material for entrance into the double backer 22.

The double backer 22 has associated with it a splicer 62 which is of a construction identical to that of the splicers 34, 36, 50 and 52, and thus includes a pair of roll stands 38*i* and 38*j* for supporting rolls of single ply web material such as kraft paper. The output material from the double backer splicer 62 passes through a double backer preheater 60. The preheater 60 consists of steam-heated steel drums over which the output of the double backer splicer 62 and two-ply web material 24 from the single facers 16 and 18 are drawn. The preheater 60 is adjustable such that the angular portion of the steel drums over which the web material 24 is drawn is variable, and is determined by a movable arm operated in accordance with input parameters supplied to the preheater 60 in a well-known manner. The preheater 60 is obtainable commercially from the Langston Corporation.

The three web components 30, 24 and 24 supplied by the double backer splicer 62, single facer 16, and single facer 18 are drawn into the double backer glue station 64 where they are laminated to form the double-ply composite web material 32 shown in FIG. 2. The composite web 32 is then passed over double backer hot plates 66 which serve to dry the glue supplied in the double backer glue station 64 and firmly affix the various components of the composite web material 30.

The output material of the double backer hot plates 66 are drawn off by drive rolls 68 and passes through a rotary shear 70 and diverter 72. The drive rolls 68 and other drive mechanisms in the hot plates 66 and double backer glue station 64 are controlled by a double backer clutch 65, which is operable between engaged and disengaged positions to advance or halt the production of composite web material 32. It is important to note that only the drive components of the double backer glue station 64 are disengaged; other components of the double backer glue station 64 which maintain the web components in contact are not disturbed.

The rotary shear 70, when activated, severs the web material 32 passing therethrough. The diverter table 72 operates between two positions to either pass the composite web material onto additional processing machines, to be described hereinafter or to divert the web material to the floor of the material 10 as scrap. When the rotary shear 70 is in so-called double-cut mode, the diverter table 72 diverts the output of the rotary shear 70 to the floor such that waste pieces of predetermined size accumulate on the floor.

The diverter table 72 normally passes the web material 32 to a slitter/scorer 74. The slitter/scorer 74 operates in a pre-set adjustable manner to slit the incoming web material 32 into webs of narrower widths and score these width webs at desired locations to facilitate subsequent folding of the output material into a desired final configuration. In a preferred embodiment, the slitter/scorer comprises a three-station device known as a triplex which is obtainable commercially from the Langston Corporation. The triplex has three stations which may be set up in three separate configurations of output web widths and score line configurations, with only one station being active, such that an order change can be easily implemented by switching the triplex from a first position, wherein the incoming web material is processed at a first preset station, to a second position wherein the incoming material is processed by a second preset station and so forth.

As can be seen, the output of the slitter/scorer 74 may include top and bottom webs of narrower widths than the web provided as input to the slitter/scorer 74. The top and bottom webs may in turn be supplied to top and bottom knives 76 and 78 which are provided with belts to pull the two incoming webs from the slitter/scorer 72 and which cut the webs into output boards of predetermined lengths. The knives 76 and 78 include control apparatus which monitors the number of cuts which have occurred for the present order. The control apparatus of the knives 76 and 78 may also include a plurality of predetermined order specifications which include lengths and quantities for a number of different orders. Upon appropriate input command, the top and bottom knives 76 and 78 may switch from one order parameter set to the next.

The output boards from the top and bottom knives 76 and 78 are supplied to material handling apparatus which in the preferred embodiment comprises a pair of downstackers 80 and 82 which draw in the boards provided as output from the knives 76 and 78 and arrange the boards into stacks of a predetermined quantity, such as fifty boards. When the predetermined quantity in a stack is reached, the downstackers 80 and 82 discharge the accumulated stack onto a roller conveyor for further processing.

In accordance with the present invention, means are provided for generating feedlength signals proportional to the length of web material supplied by the individual web producing means. As embodied herein, these generating means include pulse generators 84 and 86.

The pulse generator 84 is mounted on the C-flute medium splicer 36 and includes a roller placed in contact with web material being supplied by the C-flute medium splicer 36 to produce a pulse signal for every linear foot of web material supplied by the C-flute medium splicer 36. The pulse generator 84 is of conventional construction such as those manufactured by the Durant Corporation. The pulse generator 84 may be mounted on the C-flute medium splicer at any position which will provide a feedlength signal proportional to the amount of web material supplied by the splicer. In a preferred embodiment, the pulse generator 84 is placed in contact with the web material at a point of the C-flute medium splicer 36 which is equidistant from roll stands 36*c* and 36*d*.

In a similar manner, an identical pulse generator 86 is mounted on the B-flute medium splicer 52 to provide an intermediate feedlength signal proportional to the amount of web material supplied by the B-flute medium splicer 52.

In accordance with the invention, means are provided for generating a feedlength signal proportional to the output of the composite web producing means. As embodied herein, these generating means include a pulse generator 88 identical to pulse counters 84 and are 86, and located in an identical position on the double backer splicer 62 to provide a double backer feedlength signal proportional to the amount of web material supplied by the double backer splicer 62. Since the double backer splicer provides a web which forms the double backer liner 30 of the double ply composite web output material 32 supplied as output by the double backer 22, the pulse generator 88 thus provides a double backer feedlength signal proportional to the amount of material output from the double backer 22.

A detector 90 is mounted at the input to the slitter/scorer 74. In a preferred embodiment, the detector 90 constitutes a proximity detector such as a type 42 MRP-5000 made by the Electronic Corporation of America. Detector 90 is normally inactive when web material is present. However, when the web material is severed during an order change such that the old order material is pulled through the slitter/scorer and the new material is held essentially stationary by disengagement of the double backer clutch, the detector 90 will generate a signal indicative of the passage of the trailing edge of the old order material.

A pair of pulse generators 92 and 94 are provided at the input of the downstackers 80 and 82, respectively. The pulse generators 92 and 94 are of conventional construction such as those also obtainable from the Durant Corporation. In a preferred embodiment, the pulse generators 92 and 94 are coupled to the drive mechanisms of the downstackers 80 and 82 and thus provide a feedlength signal which is generally proportional to the amount of material passing into the downstackers 80 and 82. In a preferred embodiment, the pulse generators 82 and 94 provide a pulse signal for every 4.2 inches of travel of the input drive mechanism to the top and bottom downstackers 80 and 82.

Figure 3:
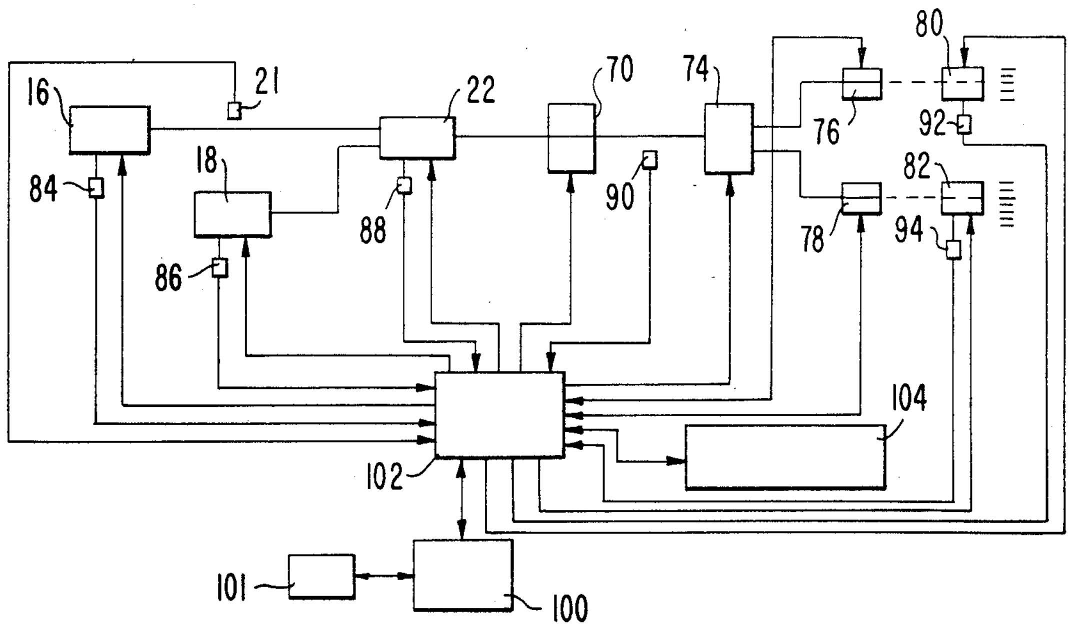
FIG. 3 is a block diagram of the corrugator machine shown in FIG. 1, along with associated control and operating components.

In accordance with the invention, control means are provided for comparing first, second, and third feedlength signals with a plurality of inventory values and for generating control signals to sequentially operate the splicers and the shear when the differences between the feedlength values and the stored inventory values reach predetermined values. As embodied herein, the control means includes a process control computer 100 of conventional construction which may be, for example, an Allen Bradley programmable controller, type PLC 230, and associated input/output interface 102, as shown in FIG. 3. Input signals from the various components of the corrugator machine, such as limit switches, temperatures, pressures, fluid levels, overspeed indicators, etc. (not shown) are provided to the computer 100 via the input/output interface 102 which provides signal conditioning in a well-known manner. Other inputs to the computer 100 include conventional operator-entered parameters such as on/off, desired machine speed, etc., via an operator's console 104. The computer 100 also includes a memory device 101 which can store various calculation values in a manner to be more completely described.

The desired machine speed is supplied by the computer 100 as a drive control command to the double backer 22. The speed of the related components such as the single facers 16 and 18, sandwich belts 46 and 56, bridge belts 48 and 59, and components of the dry end 14 are controlled by the computer in a well-known manner depending upon the speed of the double backer. The computer also provides output controls such as commands to activate the splicers, commands to reset the bridge web guides 38 for a different order width and commands to readjust the processing parameters of the dry end components, in a manner to be more completely described hereinafter.

In practice, not all components of the corrugator machine 10 may be operational for every order being manufactured. For example, it may be desired to provide a final output product which includes only a single fluted medium and liner layer. Accordingly, only one of the single facers 16 or 18 would thus be required. Similarly, not every order would require operation of both knives 76 and 78 or downstackers 80 and 82.

When it is desired to perform an order change, the material for the new order often is different from that specified by the old order. Thus, rolls of different web materials must be placed on the roll stands 38*a*–38*j*. When the specified amount of material for the old order has been processed, the splicers 16, 18, 50, 52, and 62 are activated to change over to the new material. Occasionally, this will result in an old order roll of material being left with only a small amount remaining thereon, such that it is not suitable to utilize this roll for an additional order. A significant amount of scrap is thus produced. However, it is also common in the industry that quantities specified for each order are not exact. Thus, an overage or shortage of up to 10 percent may be permissible on an order. In such a situation, it may be determined that rather than activating a splicer to cause a small amount of material to remain on the old order roll and thus be scrapped, it is acceptable to continue processing the old order until such time as the material remaining on the roll has been exhausted. The splicer will then be activated upon expiration of the roll. This process is known as as "tail grab" splice.

Alternatively, it may be specified that the tail grab procedure is not acceptable and that the order should be terminated when the specified count or linear footage of the old order has been processed.

In preparation for a set up for an order change, the operator will specify which components of the corrugator machine are required for the new order. In a preferred embodiment, this is done by depressing push-buttons on the operator's console 104, each of which corresponds to a respective component of the corrugator machine 10. The operator's console 104 may be located at any convenient position on the processing line, such as, for example, between the diverter 72 and slitter/scorer 74. In a preferred embodiment, the operator's console 104 includes a display similar to that shown in FIG. 1, with a plurality of indicator LED's which serve to indicate trouble spot locations and the progress of a splice through a corrugator machine 10 in a manner to be more completely described.

After the operator has specified which of the corrugator machine components will be required in the new order, the operator specifies which of the two automatic order change options, linear footage or tail grab, are desired for the new order. Finally, the operator arms the computer to process an automatic order change.

As an order nears its end, control apparatus in the top and bottom knives 76 and 78 generates a signal indicating that the old order will be completed when a predetermined number of additional operations of the knives 76 and 78 have occurred. At this time, operators of the corrugator machine 10 make certain that the web material for the new order is in place in the idle roll stand of each of the splicers 34, 36, 50, 52 and 62. Also at this time, the computer initializes all internal counters and storage locations for an order change, activates rotating beacon lights throughout the corrugator machine area to warn operators of an upcoming order change and generates an inventory value proportional to the amount of material present in the corrugator machine between the single facer 16 and the shear 70. This value is determined by a comparison of the feedlength signals generated by pulse generators 84 and 88, and the relative physical location of the single facer 16 and shear 70. Specifically, this value is equal to the material path distance between the single facer 16 and the shear 70 (259 feet in the preferred embodiment) plus an amount of web material accumulated on the bridge. This accumulated amount is equal to a constant plus a running difference value in counts produced by pulse generators 84 and 88. In the preferred embodiment, the constant is 60 feet. Thus, if pulse counter 84 has generated a value which is 15 greater than the value generated by pulse generator 88 as stored in a memory location of device 101, the inventory value would be equal to 259 feet, plus 60 feet, plus 15 feet, totalling 334 feet.

Beginning at this time, a continuous comparison is made between the inventory value and the double backer feedlength signal provided by pulse counter 88. When the difference between the inventory value and the accumulated value of the pulse generator 88 reaches zero, the computer activates the C-flute medium splicer 36 to sever the material currently being supplied by the roll stand 38*c* or 38*d* and splice in material from the other roll stand 38*c* or 38*d*. At this point, the upstream feedlength signal supplied by pulse generator 84 is noted as indicating a splice from the C-flute single facer 16. Also at this point, a memory location in device 101 is activated to indicate which roll stand 38*c* or 38*d* is supplying material to splicer 36. A similar action takes place when each splicer is activated. The computer also activates an LED on the operator's console 104 above the representation of the C-flute single facer to indicate the position of the splice.

The splicing operation just described assumes that the linear footage option was specified by the operator. In the event that a tail grab option order change was specified, the C-flute medium splicer 36 would be activated upon exhaustion of the roll supplying web material for the old order. The value of the upstream feedlength signal supplied by pulse generator 84 would be noted and an LED activated on the control panel to indicate the position of the splice in the same manner as described for the linear footage order change.

At this time, a first splicer of the upstream single facer has been activated. The computer begins a continuous comparison of the upstream feedlength value to an upstream position value stored in memory device 101 which is a function of the relative locations of the splicers 34 and 36 of the single facer 16. This position value is also a function of the ratio of medium to liner in the two-ply web 24 produced by the C-flute single facer 16. In the preferred embodiment, this material is supplied in the ratio of 1.47/1. That is, for each running foot of two-ply web material (and liner material 26) produced by the C-flute single facer, 1.47 feet of medium material 28 are required. The purpose of this comparison is to determine at what point to activate the C-flute liner splicer 34. Specifically, the material path distance for the C-flute liner splicer 34 between the actual splice mechanism of the splicer 34 and the position in the C-flute single facer 16 where materials from the splicers 34 and 36 come together is compared to the splice location which is equal to a similar path distance for C-flute medium splicer 36 minus the output of the C-flute medium splicer 36 (as determined by the upstream feedlength signal generated by pulse generator 84), multiplied by the medium-to-liner ratio.

When it is determined that the initial splice produced in the C-flute medium splicer 36 has reached a distance from the single facer 16 equal to the material path distance for splicer 34, the C-flute liner splicer 34 is activated by the computer. Splices from the splicers 34 and 36 thus arrive at the single facer 16 in coincidence. The computer also activates an LED indicator on the operators console 104 directly above the C-flute liner splicer 34 to indicate the position of a splice produced thereby.

At this time, the computer begins monitoring an intermediate inventory value proportional to the amount of web material between the double backer glue station 64 and the next downstream single facer. In a preferred embodiment, the B-flute single facer 18 is the next downstream single facer and the intermediate inventory value is proportional to a signal generated by the pulse generator 86 located on the B-flute medium splicer 52 and to the pulse generator 88. The intermediate inventory value is continuously compared to an upstream inventory value stored in memory device 101 which is a function of the relative location of the single facer 16 and the double backer 22, and which is also a function of the difference between a feedlength value proportional to the amount of web material supplied by the immediate upstream single facer and a double backer feedlength value proportional to the amount of material output from the double backer. In a preferred embodiment, the upstream inventory value is determined by the relative location of the single facer 18 and the single facer 16. The upstream inventory value of the preferred embodiment is also proportional to the upstream feedlength signal supplied by pulse generator 84 and the double backer feedlength signal supplied by the pulse generator 88. It should be noted that the double backer feedlength signal generated by pulse generator 88 is proportional to material drawn off the bridge 20, whereas the upstream feed length signal generated by pulse generator 84 is proportional to material generated by the single facer 16 which is placed onto the bridge 20. The computer thus calculates the distance from the splices produced by C-flute splicers 34 and 36 from the double backer glue station 64 and continuously compares this to the amount of material remaining between the double backer glue station 64 and the B-flute medium splicer 52. In a preferred embodiment, the computer 100 performs the comparison of the intermediate and upstream inventory values in the following manner. First, the physical distance between the B-flute single facer 18 and the double backer glue station 64 is retrieved from memory device 101. To this value is added material from the B-flute single facer 18 which is stored on bridge 20. Specifically, the computer attempts to control the speed of the double backer 22 and the single facers 16 and 18 such that a specified amount of inventory material such as 60 feet is continuously stored on the bridge 20, as detected by a sensor 21. In the preferred embodiment, the sensor 21 consists of a photoelectric detector which senses an accumulation of material on the bridge 20 equal to the specified 60 foot amount. Once the sensor 21 is activated, the computer maintains the actual amount of material on the bridge 20 as a value in an up-down counter in memory device 101, which is incremented by every pulse of the pulse generator 86 and decremented by every pulse of the pulse generator 88. Recalling that each pulse of the pulse counter 86 represents the addition of one linear foot of material to the bridge 20 and each pulse of the pulse generator 88 represents the withdrawal of one linear foot of material from bridge 20, it can be seen that the amount of material maintained on the bridge 20 can be continuously determined by continuously monitoring the output signals of pulse generators 86 and 88. To this summation is added a positive or negative value determined by the adjustment of the preheater 60.

In a similar manner, the feedlength value is calculated beginning with a constant value representing the physical distance between the C-flute single facer 16 and the double backer glue station 64. Next, a value representing the amount of material from the C-flute single facer 16 stored on the bridge 20 is determined using a sensor 21, an up-down counter in memory device 101, and the signals from pulse generators 84 and 88 in the same manner as previously described with regard to material stored on the bridge 20 by the C-flute single facer 18.

When the difference between these quantities reaches zero, the computer activates the B-flute medium splicer 52, causing a splice to be produced in the same manner as previously described. An indicator LED is energized on the operator's console 104 to indicate the position of this splice. As the corrugator machine continues to operate, the computer continuously determines the position of all generated splices from the feedlength signals produced by the pulse generators 84, 86 and 88 and energizes appropriate LED indicators on the operators console 104 to indicate the progress of the various splices.

After the activation of the B-flute medium splicer 52, the computer continuously compares the intermediate feedlength value generated by the pulse generator 86 to an intermediate position value which is the function of the relative locations of the B-flute medium splicer 52 and B-flute liner splicer 50. In the manner identical to that described previously with regard to the upstream position value of the C-flute single facer 16, the computer continuously compares the position of the splice generated by the B-flute medium splicer 52 to the material path distance between the point in the B-flute single facer 18 where the components of the splicers 50 and 52 are joined and the position in the B-flute liner splicer 50 wherein the splice is actually produced. When the difference between these two quantities is equal to zero, the computer activates the B-flute liner splicer 50, causing a splice to be produced thereby. The computer also energizes an appropriate LED indicator above the B-flute liner splicer representation on the operator's console 104 to indicate the position of this splice.

Beginning at the time of activation of the B-flute liner splicer 50, the computer continuously compares the double backer feedlength value produced by the pulse generator 88 to the intermediate inventory value described above.

When the distance between the double backer glue station 64 and the previous splices is equal to the length of the material path from the double backer splicer 62 to the double backer glue station 64, the computer activates the double backer splicer 62. A splice is thus produced, and an LED indicator on the operator's console 104 energizes to indicate the position of this splice.

In this manner, splices produced by all splicers of the corrogator machine 10 are substantially coincident upon their arrival at the double backer glue station 64.

As indicated previously, the preheater 60 in the preferred embodiment is adjustable to provide a varying degree of wraparound of the component web materials 24 and 30 in contact with steam heated drums of the preheater 60. Therefore, the lengths of the material paths between the double backer glue station 64 and components of the wet end 12 of the corrugator machine 10 vary depending upon the setting of the preheater 60. However, the specific adjustment of the preheater 60 is known to the computer, and thus is factored in as a correction to all quantities which depend upon web material path distances between the double backer glue station 64 and components of the wet end 12 of the corrugator machine 10.

When the splice reaches a first predetermined point in the double backer hot plates 66, which in the preferred embodiment is approximately one-quarter ($\frac{1}{4}$) of the distance through the hot plates 66 as determined by double backer feedlength signal supplied by pulse generator 88, computer 100 commands corrugator machine 10 to switch from an operating speed to an idle speed. When the splices reach a second predetermined point, which in the preferred embodiment is approximately seven-eighths ($\frac{7}{8}$) of the distance through the hot plates 66, computer 100 activates a warning beacon atop the rotary shear 70 to warn the operator that shear 70 is about to operate. When the splices reach rotary shear 70, as determined by a comparison of the double backer feedlength signal with a shear inventory value determined by the physical location of the rotary shear 70 with respect the double backer 22 and the adjustment of the preheater 60, the shear 70 is operated to sever the web. As the knife of the rotary shear 70 leaves the trailing edge of the web, the computer determines whether the single cut or multi-cut operation of the rotary shear 70 has been called for by operator entry. If multi-cut operation has been commanded, the computer raises the diverter 72 and continuously operates the rotary shear 70 to produce 30-inch sheets of material following passage of the coincident splices. This is necessary where the beginning of a roll of input single-ply web material is defective.

If multi-cut operation is not called for, the computer at this time disengages the clutch of the double backer and creates a gap between the trailing edge of the old order web and the leading edge of the new order. The trailing edge continues to advance at idle speed under the action of drive components located in the slitter/scorer 74 and top and bottom knives 76 and 78. When the trailing edge of the old order web is produced by action of the shear 70, a time delay period is activated. Upon expiration of this time delay which may be, for example, three seconds to allow the trailing edge of the old order web to be processed by the slitter/scorer 74, the slitter/scorer 74 is activated to process succeeding material by a second preset processing station of the slitter/scorer 74. Another predetermined time delay of, for example, three seconds is then activated to permit the web material to completely clear the slitter/scorer and the top and bottom knives 76 and 78 and to allow guide slots of the knives 76 and 78 to assume new positions, and the knives 76 and 78 to be programmed for the new order. At this time, the double backer clutch is reengaged at idle speed to allow web from the new order to advance. When the leading edge of the new order passes detector 90, the corrugater machine is commanded by the computer 100 to resume normal operating speed.

Beginning at the time the shear 70 severs the web, the computer monitors the pulse generators 92 and 94, and continuously compares the accumulated signal therefrom (which constitutes a final feedlength value) to a preset value proportional to the material path length from the input of the downstackers 80 and 82 back to the position of the shear 70 which constitutes a final inventory value. When the difference between these two values is equal to zero, the computer commands the downstackers 80 and 82 to discharge the material stored therein, regardless of the number of sheets present, to clear all material from the old order from the corrugator machine 10 and place all such materials on outgoing roll conveyors. The computer then commands the downstackers 80 and 82 to reset back stops and other positioning devices for the size of boards specified by the new order.

In this manner, an order change can be effected with a minimum amount of waste material. Furthermore, production downtime is minimized since the only period of non-operation of the entire corrugator machine 12 is the disengagement time of the double backer clutch provided to clear the material from the old order from the dry end of the machine. This period of disengagement is typically on the order of six seconds. The new order is thus proceding through portions of the corrugator machine 10 at the same time that the old order is being processed by other portions thereof.

It is to be emphasized that although the described embodiment includes only two single facers in the corrugator machine 10, the invention is not so limited. Rather, the principles of the present invention may be applied to a corrugator machine having either more or fewer numbers of single facers. For each intermediate single facer between the upstream single facer and the double backer, synchronous splice operation is provided by continuously computing an intermediate feedlength value proportional to the amount of web material supplied by the first splicer of an intermediate single facer to an intermediate inventory value which is the function of the relative location of the intermediate single facer and the single facer immediately upstream therefrom and of the difference between a feedlength value proportional to the amount of web supplied by the intermediate upstream single facer and the double backer feedlength value. The first splicer of the intermediate single facer is then activated when the difference between the intermediate feedlength value and the first intermediate inventory value reaches the predetermined value. The intermediate feedlength value is continuously compared to a second intermediate feedlength for each intermediate single facer which is a function of the relative location of the first and second splicers of the intermediate single facer. Finally, the second splicer of the intermediate single facer is activated when the difference between the intermediate feedlength value and the second intermediate inventory value reaches a predetermined value.

It will be apparent to one skilled in the art that various other modifications and variations can be made in the apparatus and method of the invention without departing from its spirit and scope. The invention may find application in other manufacturing fields in which a plurality of machines, capable of various speeds, all operate on a continuous web of material, such as in the making of rolled steel products. Thus, it is intended that the present invention cover the modifications and variations of this invention provided they come within the scope of the appended claims and their equivalents.

What is claimed is:

1. Apparatus for changing the output material of a corrugator machine having a first and second single facers, each single facer including first and second splicers supplying single ply web material, a double backer producing composite web material and having a splicer supplying single ply web material, and a shear, the output material being changed from a first order material to a second order material, said apparatus comprising:

a first signal generator producing a first feedlength signal proportional to the length of single ply web material supplied by the first splicer of the first single facer;

a second signal generator producing a second feedlength signal proportional to the length of single ply web material supplied by the first splicer of the second single facer;

a third signal generator producing a third feedlength signal proportional to the length of single ply web material supplied by the double backer splicer;

a memory device for storing a plurality of position values which are functions of the relative locations of the first and second splicers of the first and second single facers, and a plurality of inventory values which are functions of the relative locations of the first and second single facers, the double backer, and the shear, said inventory values also being functions of the differences between said first, second, and third feedlength signals; and control means for generating said inventory values, for comparing said position values with said feedlength signals, for comparing said inventory values, and for generating control signals to sequentially operate the splicers and the shear when the differences between said feedlength signals and said position values and between said stored inventory values reach predetermined values, whereby splices in single ply web materials of the composite web material output of the double backer and a severance in the composite web material separating the first and second orders are formed in substantial coincidence.

2. Apparatus as recited in claim 1 for changing the output of a corrugator machine additionally having a device for accumulating the output of the corrugator machine, wherein said shear produces a shear signal upon operation thereof, and wherein said apparatus comprises a fourth signal generator producing a feedlength signal proportional to the length of material entering the accumulating device, said control means generating a control signal to cause the accumulating device to discharge all material of the old order when the accumulation of the fourth feedlength signal beginning at the time of production of said shear signal equals an inventory value which is a function of the material path distance between said shear and the accumulating device.

3. Apparatus as recited in claim 1 wherein said first, second, and third signal generators each include a contact member in contact with associated web material such that movement of the associated web material generates pulse signals proportional to the movement of the associated web material.

4. Apparatus as recited in claim 3 wherein said single facers each include a pair of roll stands, and said contact members contact associated web material at a point on the associated splicer which is in contact with associated web material, said point being equidistant between roll stands of said splicer.

5. Apparatus as recited in claim 1 further comprising a bridge detector generating a signal upon accumulation of a predetermined inventory of web material between one of said single facers and the double backer.

6. Apparatus as recited in claim 5 wherein said control means comprises an up-down counter which is incremented by said first signal generator and decremented by said third signal generator to maintain an inventory value proportional to the amount of web material stored on the bridge.

7. Apparatus for the continuous production of composite web products, comprising:

means for producing a plurality of individual webs at respective rates of output;

means for producing a composite web by combining the outputs of said individual web producing means;

means for generating a feedlength signal proportional to said composite web producing means; and control means for comparing said composite web producing means output with a desired total order quantity, for generating an order change signal upon detection of a predetermined difference value between the output of said composite web producing means and said desired total order quantity, and for sequentially generating control signals delivered to said individual web producing means and to said composite web producing means to vary the respective outputs of said individual and composite web producing means.

8. Apparatus as recited in claim 7 further comprising second measuring means for generating feedlength signals proportional to the length of web material supplied by said individual web producing means, and a memory device for storing inventory values which are functions of distances between said individual web producing means and said composite web producing means and of said feedlength signals, and wherein said control means generates said control signals in response to comparison between said inventory values.

9. Apparatus as recited in claim 8 wherein said individual web producing means comprises a splicer.

10. Apparatus as recited in claim 9 wherein said individual web producing means comprises a plurality of said splicers each being operative to produce a splice in an individual web upon receipt of a control signal from said control means.

11. A method for changing the material produced by a corrugator machine from material specified by a first order to material specified by a second order, in which the corrugator machine comprises first and second single facers each having first and second splicers supplying an individual web, a double backer having a splicer supplying an individual web, and a shear for processing the output of the double backer, said method comprising the steps of:

generating a first inventory value representative of the amount of web material between the first single facer and the shear;

generating a double backer feedlength signal proportional to composite web material produced by the double backer;

continuously comparing the first inventory value and the first feedlength signal;

activating a first splicer of said first single facer to splice material specified for a second order to individual web material being supplied for said first order;

generating a first feedlength signal proportional to individual web material supplied by said first splicer of said first single facer;

continuously comparing said second feedlength signal with a first position value which is a function of the relative locations of said first and second splicers of said first single facer;

activating a second splicer of the first single facer when the difference between the second feedlength signal and said first position value reaches a predetermined value;

generating a third feedlength signal proportional to individual web material supplied by a first splicer of the second single facer;

continuously comparing an intermediate inventory value which is a function of the relative physical location of the second single facer and the double backer and of the difference between the third feedlength signals and the double backer feedlength signal to an upstream inventory value which is a function of the relative locations of the first single facer and the double backer and of the difference between the first feedlength signal and the double backer feedlength signal;

activating the first splicer of the second single facer when the difference between the upstream inventory value and the intermediate inventory value reaches a predetermined value;

continuously comparing the second feedlength signal to intermediate position value, which is a function of the relative locations of the first and second splicers of the second single facer;

activating the second splicer of the second single facer to splice material specified for the second order to material specified for the first order when the difference between the second feedlength signal and the intermediate position value reaches a predetermined value;

continuously comparing the double backer feedlength signal to the intermediate inventory value;

activating the splicer of the double backer to splice individual web material supplied by the double backer for the second order to individual web material supplied by the double backer for the first order when the difference between the double backer feedlength signal and the intermediate inventory value reaches a predetermined value;

continuously comparing the double backer feedlength signal to a dry end inventory value which is a first function of the relative locations of the double backer and the shear;

reducing the corrugator speed to an idle speed when the difference between the double backer feedlength signal and the dry end inventory value reaches a predetermined value;

continuously comparing the double backer feedlength signal and a second dry end inventory value which is a second function of the relative locations of the double backer and the shear;

operating the shear to sever composite web material of the first order from composite web material of the second order when the difference between the double backer feedlength signal and the second dry end inventory value reaches a predetermined value; and removing the severed first order composite web material.

12. A method as recited in claim 11 comprising the additional steps of:

storing a value representative of the desired total corrugator output for a first order prior to generating the first inventory value;

measuring the running output of the corrugator;

continuously comparing the first order output value and the corrugator running output to generate a difference value;

generating an order change signal when the difference value reaches a predetermined value;

generating its first inventory value in response to the order change signal.

13. A method as recited in claim 11, comprising the additional step of momentarily disengaging the double backer clutch following operation of the shear to permit a gap to form between the trailing edge of the first order and the leading edge of the second order.

14. A method as recited in claim 11 wherein the double backer includes a pre-heater located after the double backer splicers and in which the amount of stored composite web material is variable, and wherein said dry end inventory values are functions of the amount of composite web material stored in the preheater.

15. A method as recited in claim 11 wherein the corrugator machine includes a processor for cutting the composite web into boards of predetermined size and a material handler for receiving the boards, said method comprising the additional steps of:

generating a shear signal upon operation of the shear;

generating an input feed signal at the input to the material handler which is proportional to the rate of input feed of the material handler and accumulating the input feed signal in response to said shear signal;

adjusting the parameters of the processor to the new order value a predetermined time after generation of said shear signal;

re-engaging the double-backer clutch to begin production of the second order;

operating the corrugator machine to normal speed;

continuously comparing the accumulated input feed signal to a handler inventory value which is a function of the relative location of the shear and the material handler; and discharging contents of the material handler when the difference between the accumulated input feed signal value and the handler inventory value reaches a predetermined value to complete the first order.

16. An order change method for a corrugator machine having a plurality of single facers each having a pair of splicers supplying a single layer web, a double backer having a splicer supplying a single layer web, and a shear for processing the output material of the double backer, said method comprising the steps of:

(a) activating a first splicer of the single facer located farthest upstream from the double backer;

(b) continuously comparing an upstream feedlength value proportional to the amount of web supplied by the activated splicer to an upstream position value which is a function of the relative locations of the two splicers of the upstream single facer;

(c) activating the second splicer of the upstream single facer when the difference between the upstream feedlength value and the upstream position value reaches a predetermined value;

(d) continuously comparing an intermediate inventory value proportional to the amount of web material supplied by the next downstream single facer between the next downstream single facer and the double backer to an upstream inventory value which is a function of the relative location of the single facer immediately upstream of the next downstream single facer and the double backer is also a function of the difference between a feedlength value proportional to the amount of web supplied by the immediate upstream single facer and a double backer feedlength value proportional to the amount of material output from the double backer;

(e) activating a first splicer of the next downstream single facer when the difference between the upstream inventory value and the intermediate inventory value reaches a predetermined value;

(f) continuously comparing an intermediate feedlength value proportional to the amount of web supplied by the activated splicer of the next downstream single facer to an intermediate position value which is a function of the relative locations of the first and second splicers of the next downstream single facer;

(g) activating the second splicer of the next downstream single facer when the difference between the intermediate feedlength value and the intermediate position value reaches a predetermined value;

(h) repeating steps (d) through (g) for each intermediate single facer;

(i) continuously comparing the double backer feedlength value to the intermediate inventory value of the single facer immediately upstream of the double backer; and (j) activating the double backer splicer when the difference between the double backer feedlength value and the intermediate inventory value reaches a predetermined value.

17. A method as recited in claim 16 comprising the additional steps of continuously comparing the double backer feedlength value to a shear inventory value which is a function of the relative location of the shear and the double backer; and activating the shear to sever the output web material of the double backer when the difference between the double backer feedlength value and the shear inventory value reaches a predetermined value.

18. A method as recited in claim 17 wherein the corrugator machine comprises a material handling device accepting the output of the double backer, said method comprising the additional steps of:

generating a shear signal upon operation of the shear;

continuously comparing a final feedlength value which is a function of the amount of web material entering the material handler to a final inventory value which is a function of the relative locations of the material handler and the shear;

discharging the last material of the old order from the material handler when the difference between the final feedlength value and the final inventory value is equal to a predetermined value.

19. A method as recited in claim 17 wherein step (a) of activating a first splicer of the farthest upstream single facer includes activating the medium splicer thereof; and step (e) of activating a first splicer of the next downstream single facer includes activating the medium splicer thereof.

20. A method as recited in claim 16 wherein the double backer feedlength signal is generated from the operation of the double backer liner splicer.

21. A method as recited in claim 16 wherein the upstream feedlength value is generated by the amount of material supplied by the medium splicer of the farthest upstream single facer.

22. A method as recited in claim 21 wherein the upstream feedlength signal is a signal proportional to the amount of material passing a point equidistant from both rolls of the medium splicer of the upstream single facer.

23. A method as recited in claim 16 wherein the upstream and intermediate inventory values are both functions of the adjustment of processing machinery between the double backer splicer and double backer glue station.

* * * * *